No. 750,791. PATENTED FEB. 2, 1904.
E. W. APPLEGATE.
CASH REGISTER.
APPLICATION FILED SEPT. 5, 1899.
NO MODEL. 10 SHEETS—SHEET 4.
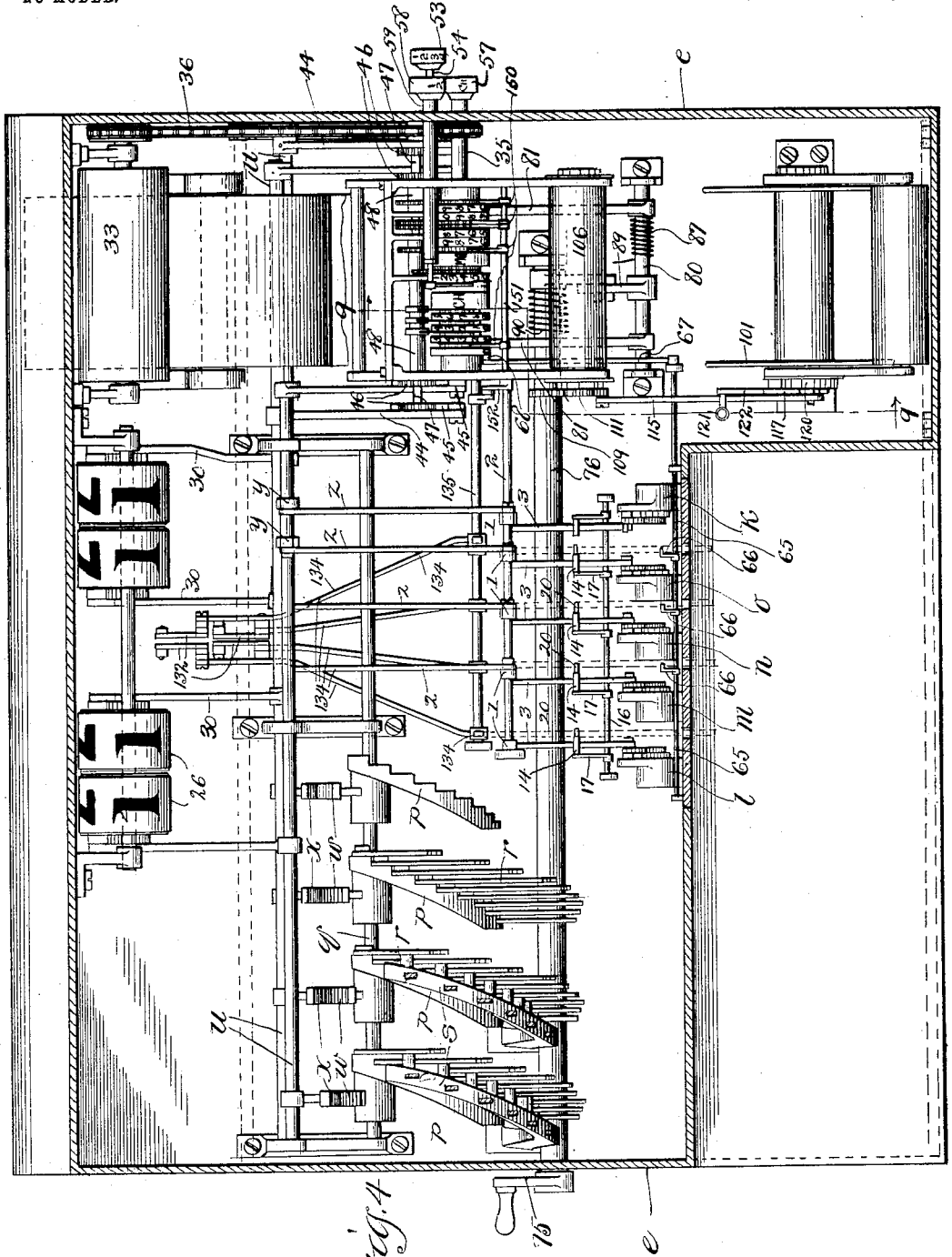

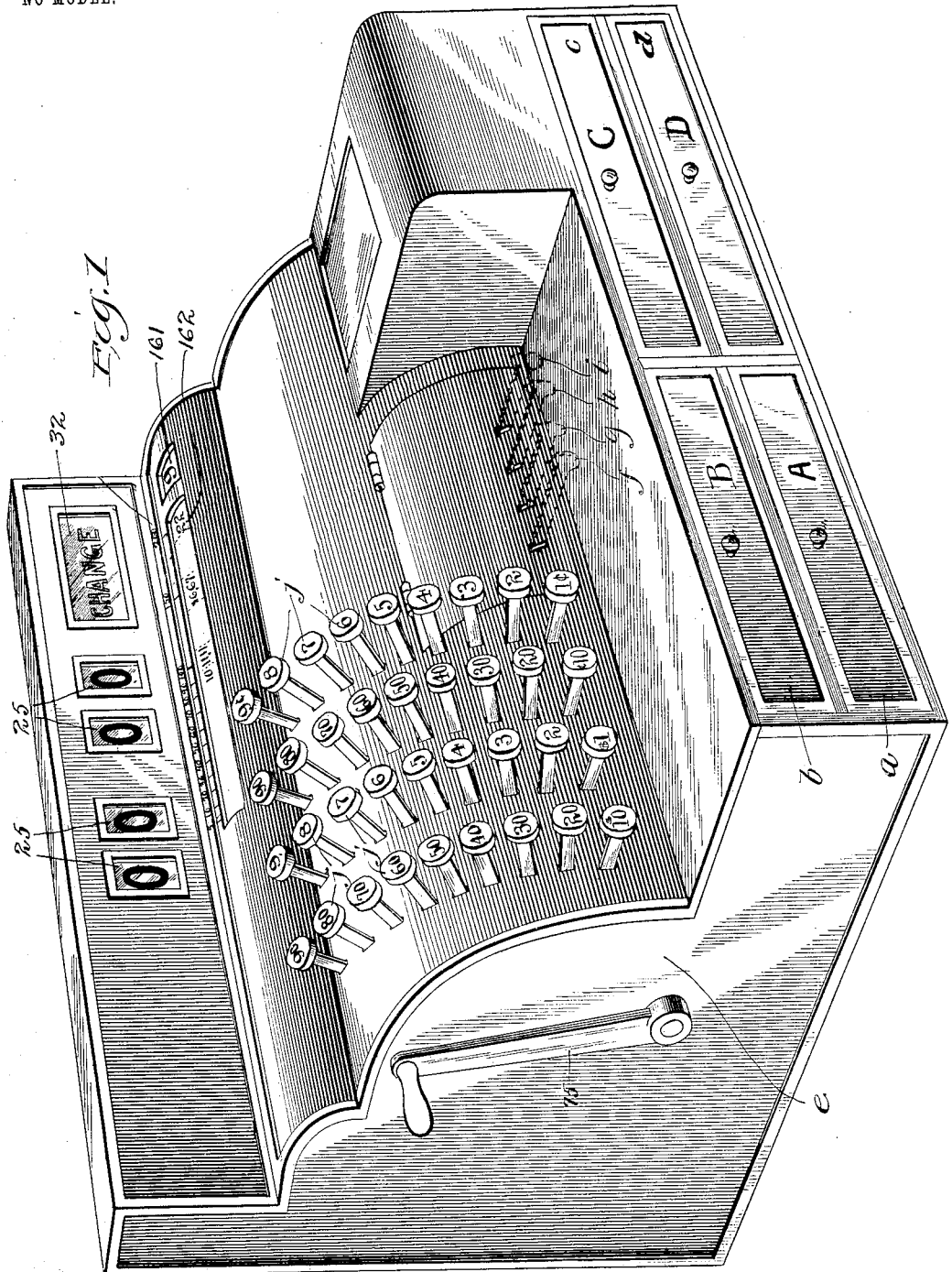

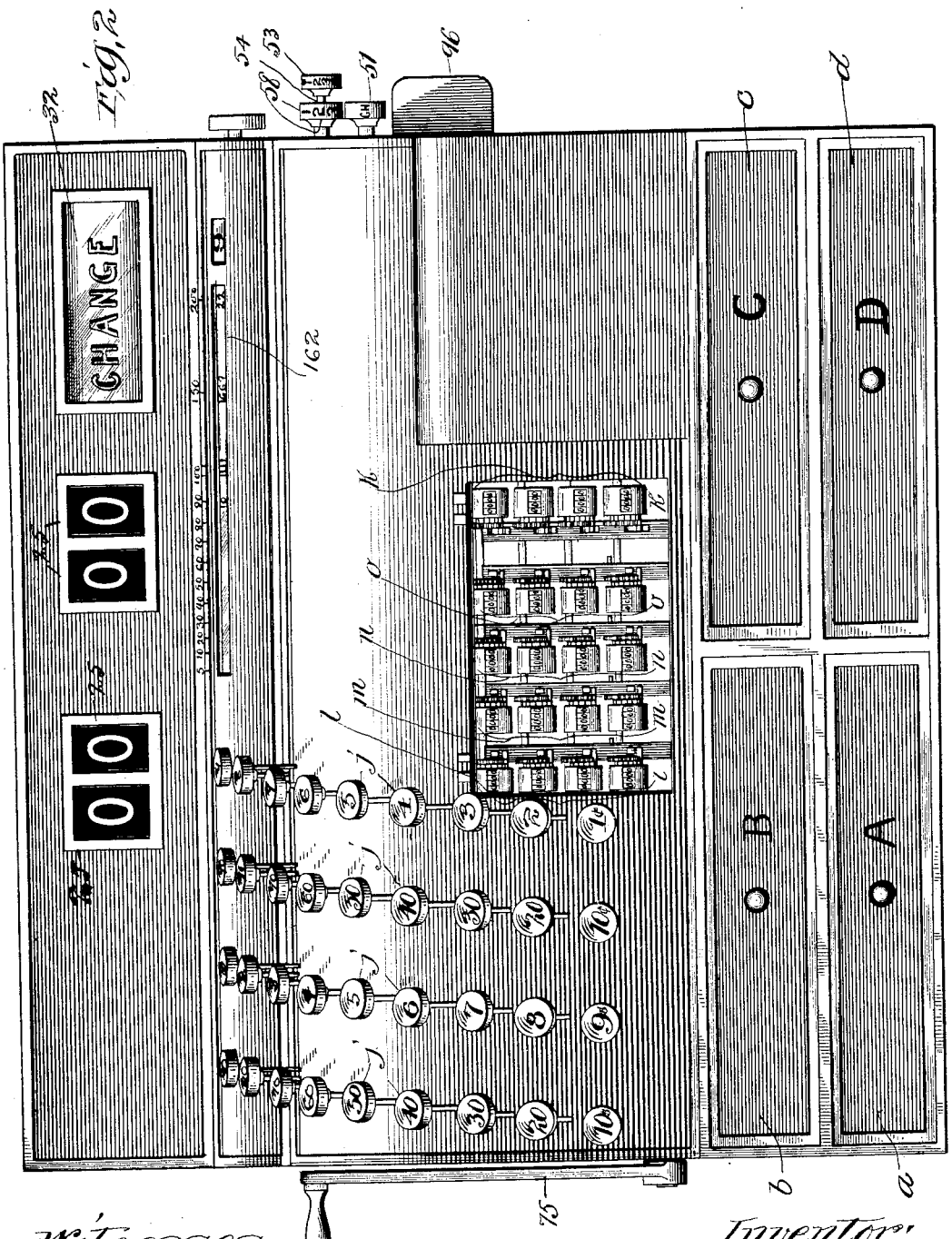

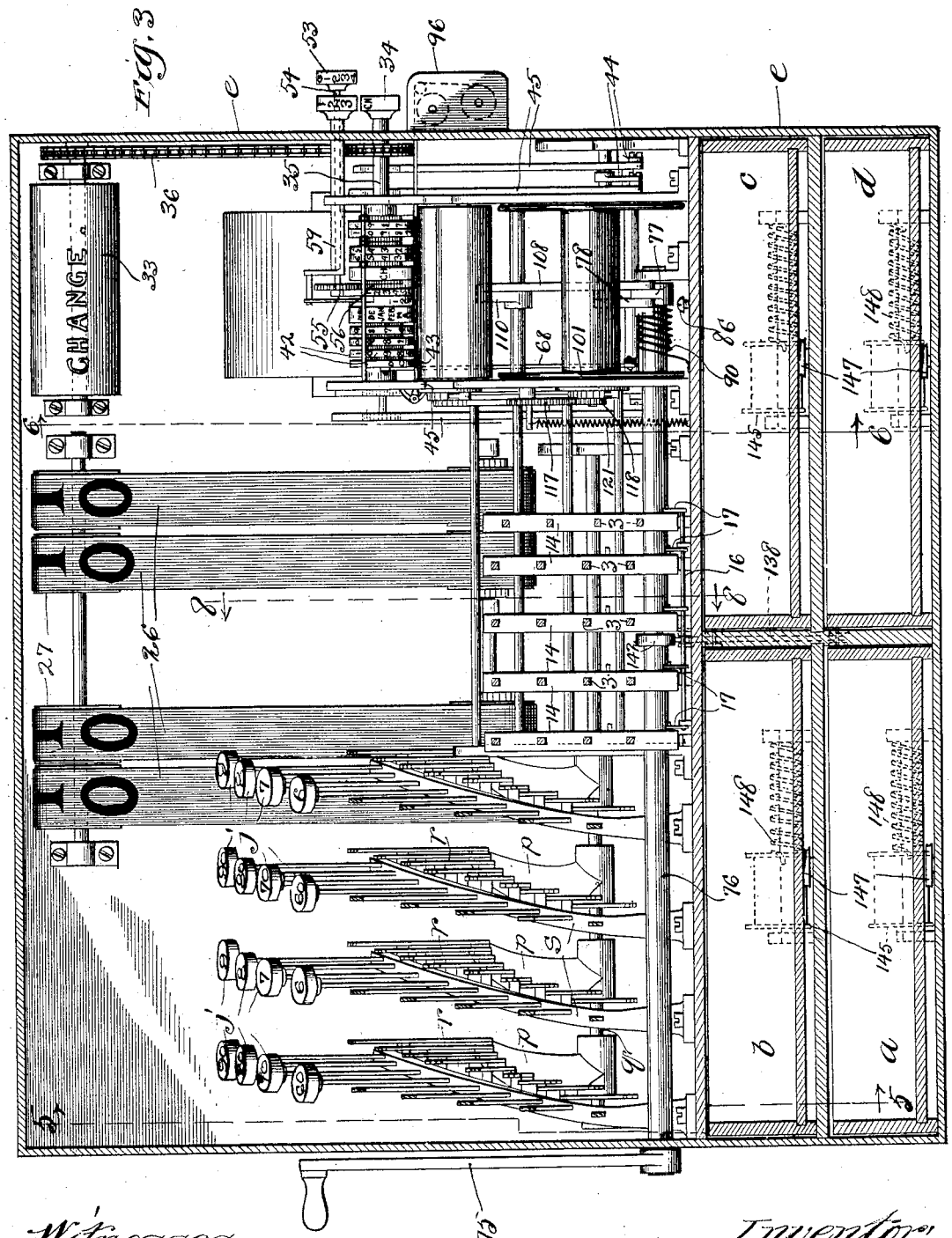

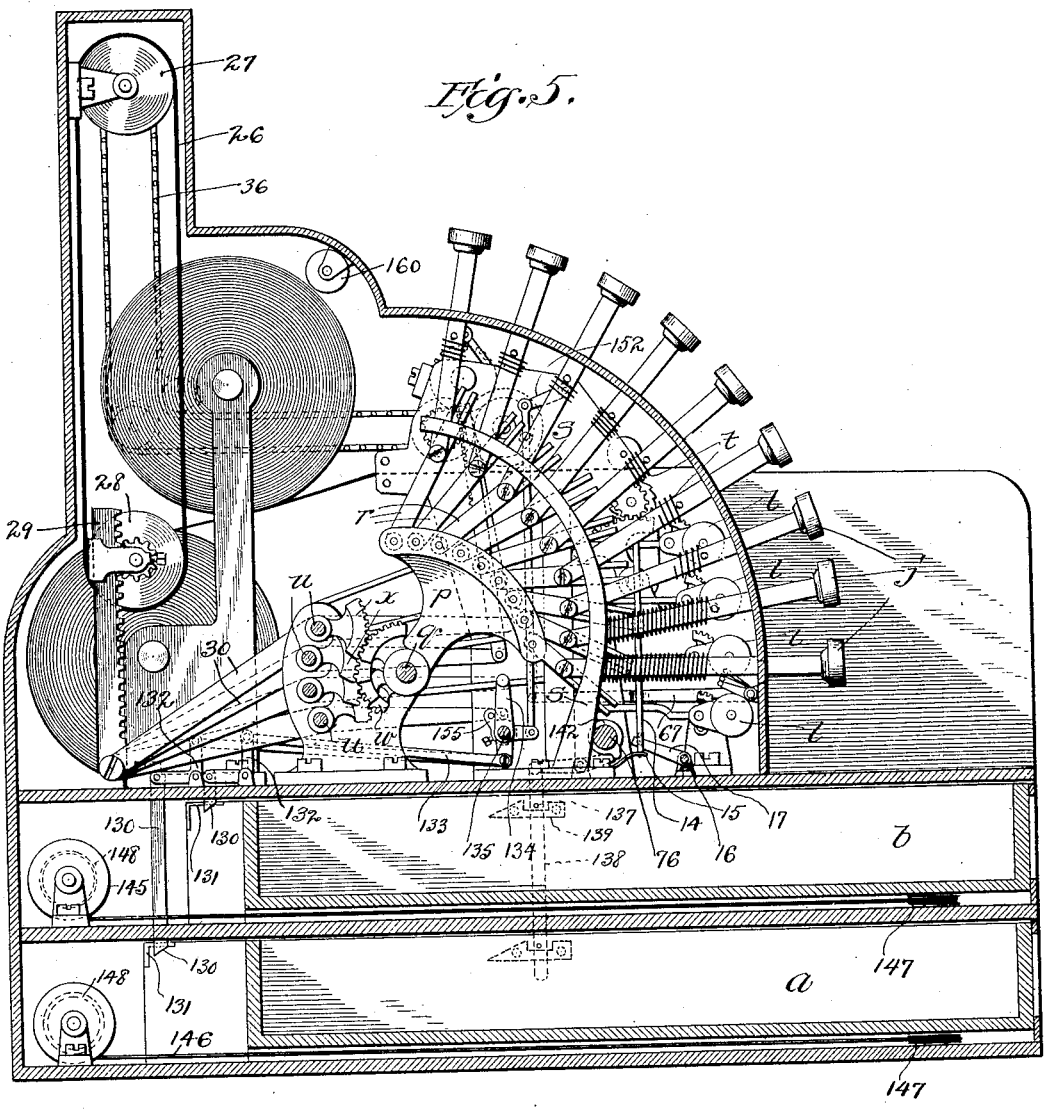

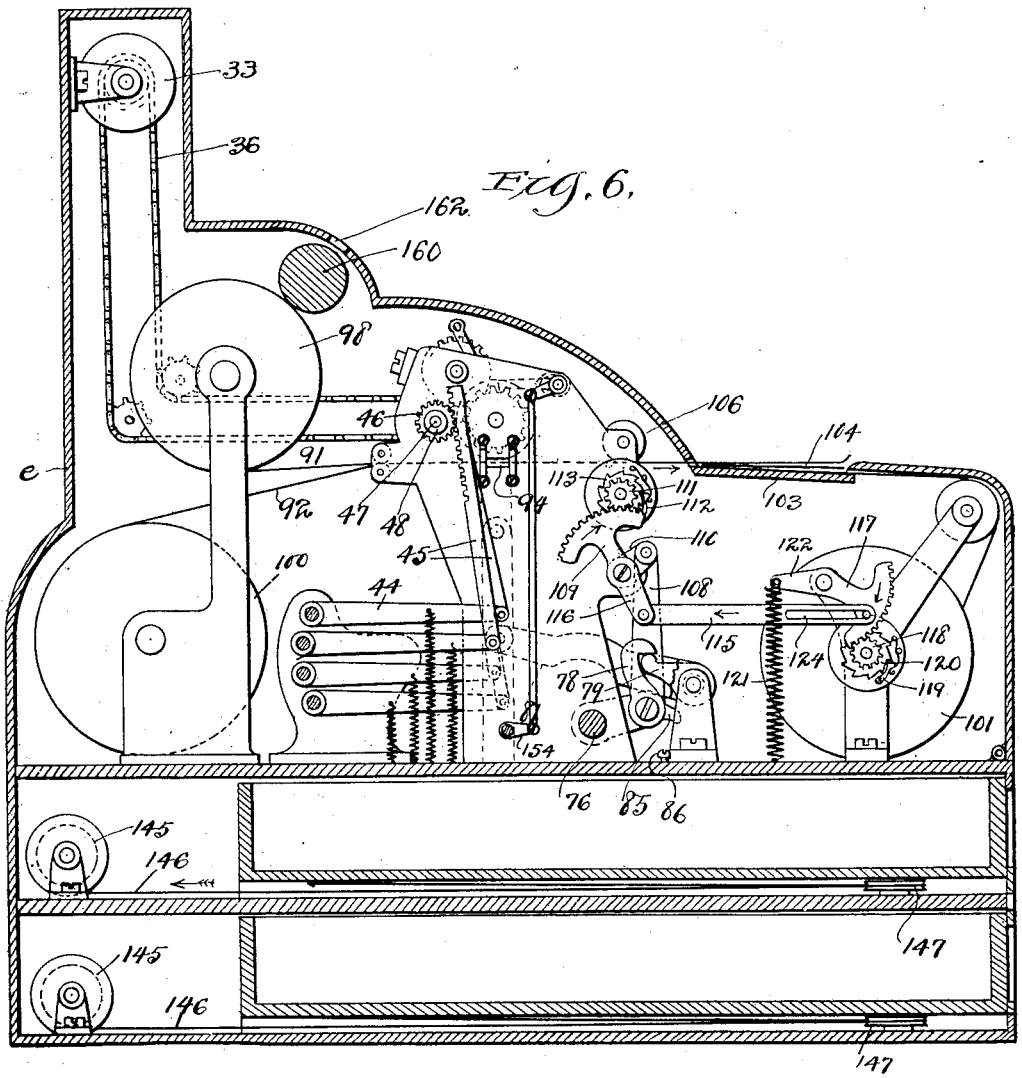

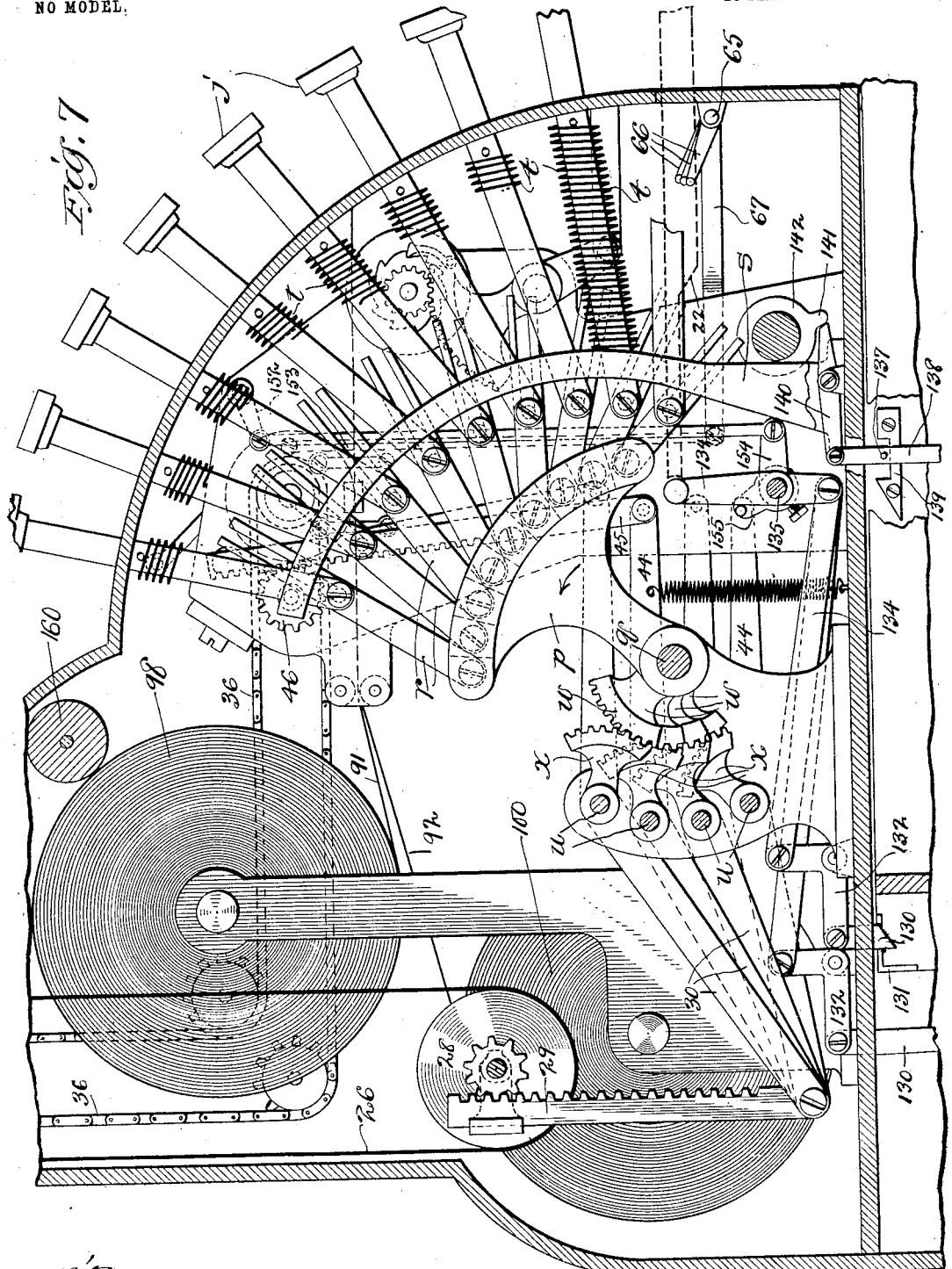

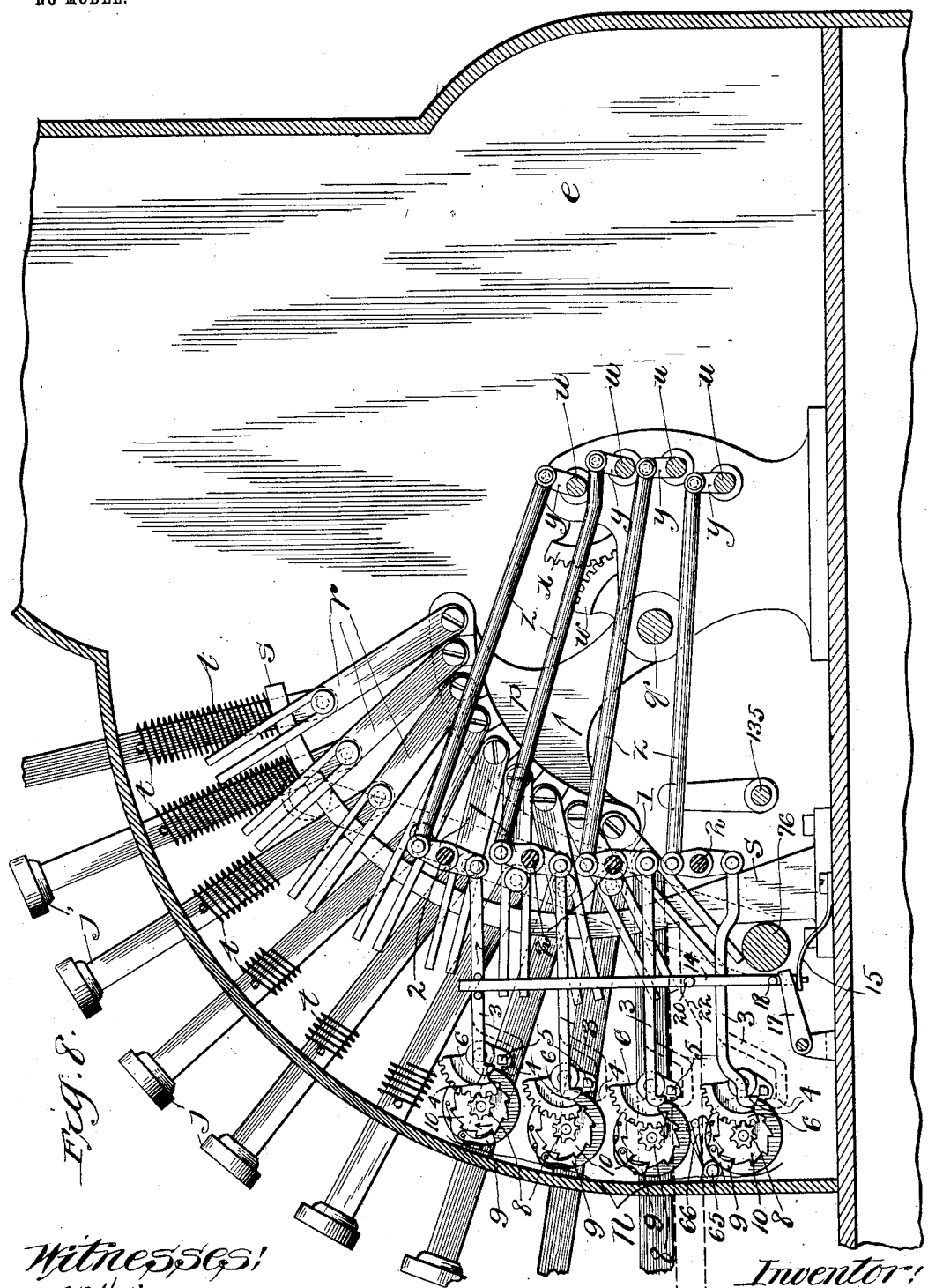

No. 750,791. PATENTED FEB. 2, 1904.
E. W. APPLEGATE.
CASH REGISTER.
APPLICATION FILED SEPT. 5, 1899.
NO MODEL. 10 SHEETS—SHEET 9.
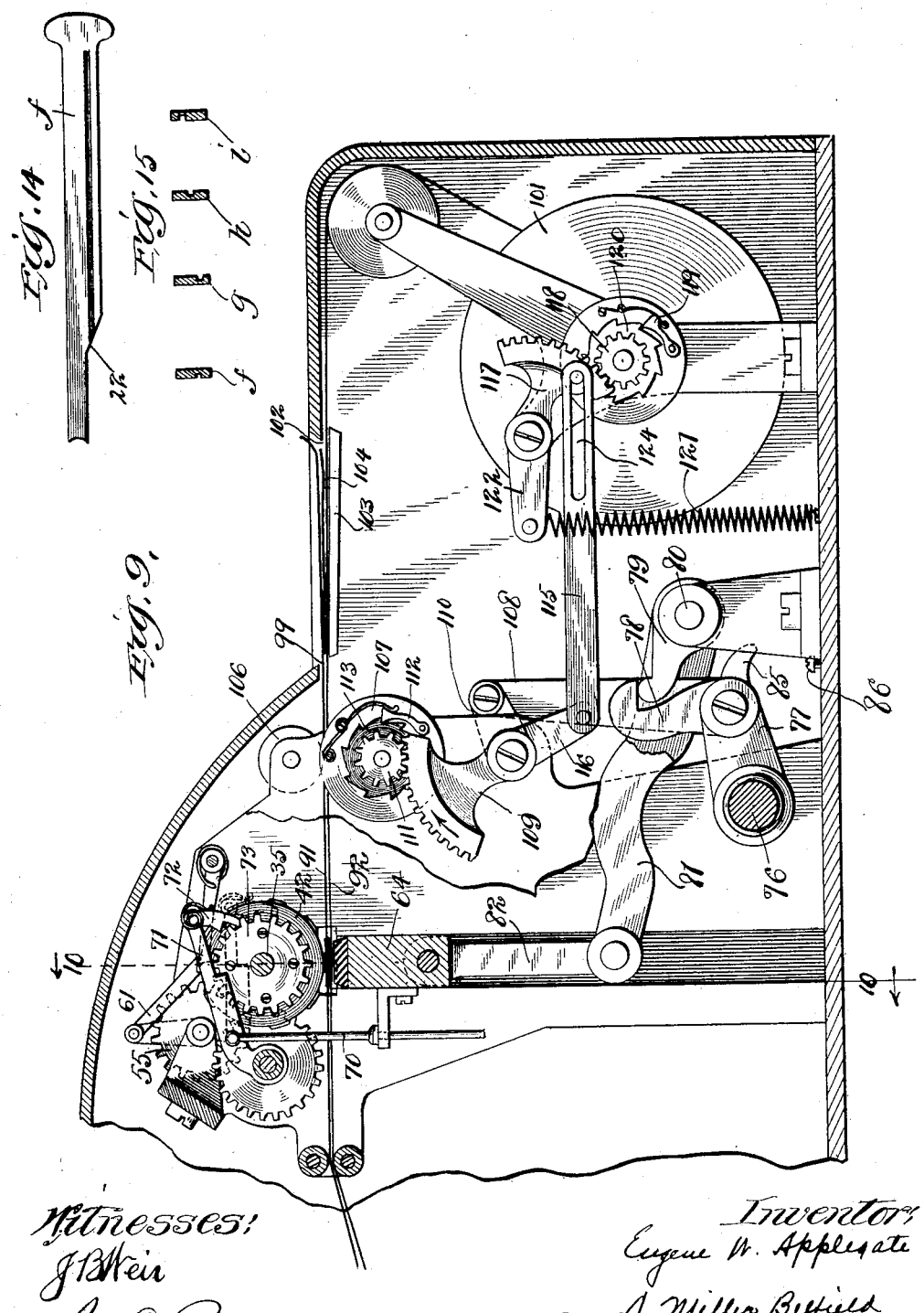
Witnesses:
J B Weir
Ira D Perry
Inventor:
Eugene W. Applegate
By A. Miller Belfield
Atty.

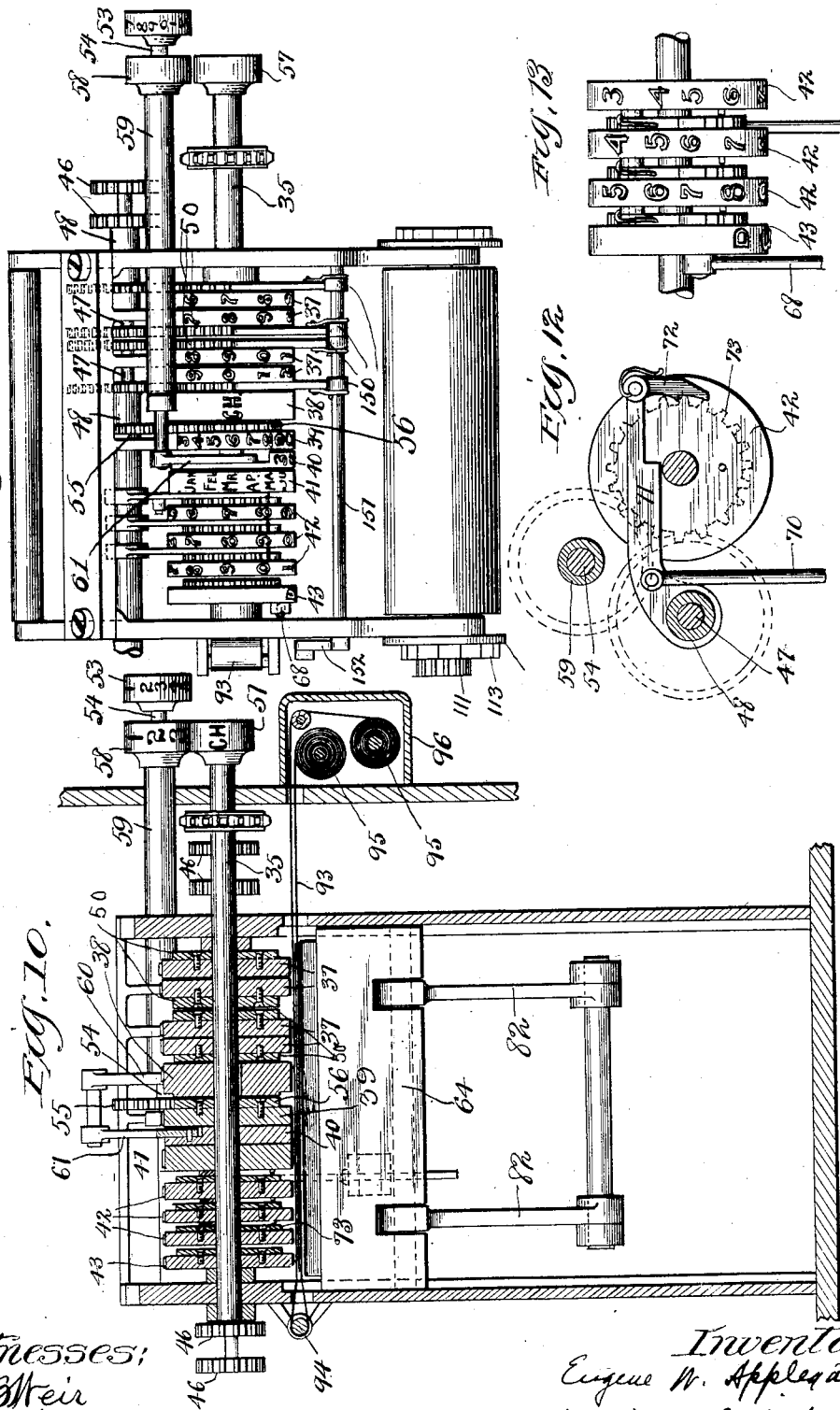

No. 750,791. Patented February 2, 1904.

UNITED STATES PATENT OFFICE.

EUGENE W. APPLEGATE, OF CHICAGO, ILLINOIS, ASSIGNOR, BY MESNE ASSIGNMENTS, TO NATIONAL CASH REGISTER COMPANY, OF JERSEY CITY, NEW JERSEY, AND DAYTON, OHIO, A CORPORATION OF NEW JERSEY.

CASH-REGISTER.

SPECIFICATION forming part of Letters Patent No. 750,791, dated February 2, 1904.

Application filed September 5, 1899. Serial No. 729,465. (No model.)

*To all whom it may concern:*

Be it known that I, EUGENE W. APPLEGATE, a citizen of the United States of America, and a resident of Chicago, county of Cook, and State of Illinois, (whose post-office address is 444 West Sixty-ninth street, Chicago, Illinois,) have invented certain new and useful Improvements in Cash-Registers, of which the following is a specification.

My invention relates in general to cash-registers, and in particular to a variety thereof having a plurality of separate or independent cash-drawers which are allotted to different clerks or different departments of the business or the like.

Prominent objects of the invention are to afford absolute security and protection against loss of money both in regard to the proprietor and to the different clerks or departments, to permit each clerk or department to keep a separate cash-account and all of them to keep a general credit-account, to arrange for the automatic recording of all details of each transaction, and to accomplish the foregoing results in a simple, practical, and effective manner.

To such and other desirable ends the invention consists in matters hereinafter set forth.

In the accompanying drawings, Figure 1 is a perspective view of a cash-register embodying my invention. Fig. 2 is a front elevation of the same with a portion of the casing removed. Fig. 3 is also a front elevation, but with the casing entirely removed and the drawers shown in section. Fig. 4 is a plan view of the machine with the entire casing removed. Figs. 5 and 6 are vertical sections taken in lines 5 5 and 6 6, respectively, in Fig. 3. Fig. 7 is a portion of Fig. 5 on a larger scale. Fig. 8 is an enlarged section taken on line 8 8 in Fig. 3. Fig. 9 is a vertical section, taken on line 9 9 in Fig. 4, on an enlarged scale. Fig. 10 is a vertical section taken on line 10 10 in Fig. 9. Fig. 11 is a plan view of the mechanism shown in Fig. 10. Figs. 12 and 13 are respectively side and front elevations of certain details of this mechanism. Fig. 14 is a side elevation of one of a plurality of special keys, and Fig. 15 is a view showing all of these keys in cross-section.

The machine shown in the drawings is provided with four separate or independent drawers $a$, $b$, $c$, and $d$, which are to be used by different clerks or departments or other divisions of the business. It is assumed that the drawers are used by clerks or departments A, B, C, and D, and they are lettered accordingly. The drawers fit within the lower part of a suitable casing $e$.

The machine is provided with four special keys $f$, $g$, $h$, and $i$, and a set of value-keys $j$ $j$ $j$. The special keys $f$, $g$, $h$, and $i$ are alloted, respectively, to the users of the drawers $a$, $b$, $c$, and $d$, and hence may be called "clerk's" or "department" keys. They are desirably made separable or detachable from the machine and dissimilar from one another, as by grooving their sides dissimilarly, as shown in Fig. 14.

The value-keys $j$ $j$ $j$ are adapted to designate United States money—that is to say, dollars and cents—although they could, of course, be made to designate any other style. They are arranged in four rows, with nine keys in each row. The first row, beginning at the left, represents tens of dollars, the second row units of dollars, the third row tens of cents or dimes, and the fourth row units of cents. The uppermost keys represent "9" or "90," as the case may be, and the other keys represent "8" or "80," "7" or "70," "6" or "60," and so on. When any amount is purchased, the proper keys to indicate that amount are pressed in.

The machine is also provided with a general register $k$ and a plurality of special registers $l$, $m$, $n$, and $o$, which latter are allotted, respectively, to the clerks or departments A, B, C, and D. The general register is for all of the sales of a certain kind and the special registers are for the sales of another kind. I propose to have the general register for all the credit sales and the special registers for the cash sales of the different clerks or departments.

Since the value-keys *j j* are arranged in four different rows, representing four different denominations of money, each of the registers *k* and *l, m, n,* and *o* consists of four sets of registering-wheels, one set for each row of keys, arranged in vertical order, one above the other, as well shown in Fig. 2. The uppermost sets of wheels in the registers are for tens of dollars, the next lower ones for units of dollars, the next to the lowest for tens of cents, and the lowermost ones for units of cents.

The value-keys *j j* are provided with mechanism by which the depression of any one or more of them can effect the registration of the corresponding amount or amounts. The mechanism shown for this purpose is best illustrated in Figs. 3, 4, and 8. It involves four swinging segments *p p p p*, one for each vertical row or bank of the value-keys *j j j*. These segments *p p* are loosely mounted upon a horizontally and longitudinally arranged shaft *q* and are connected with their respective rows of value-keys by links *r r*, which are arranged at an inclination to the key-shanks and are pivotally connected with the inner ends of the same and with the segments *p p*. The lowermost links *r* are the shortest, and the others are successively longer, in which way the depression of the lowermost of the value-keys *j j* swings the coöperating segments the least amount, and the depression of the other keys swing the same successively greater amounts. The shanks of the value-keys work in holes formed in a standard *s*, which serves to guide them and hold them at an inclination to the links *r r*. The keys are subject to springs *t t*, which force them out into normal position when they are released after depression. The outer ends of the links *r r* are forked or bifurcated, so as to allow the keys *j j* to spring outward, although the segments *p p* remain in swung position.

The swinging segments *p p* are respectively connected with four longitudinally-arranged rock-shafts *u u*, as by gears *w w* and *x x*, on the segments and shafts, respectively, whereby the swinging of one of the segments to any extent will turn the coöperating rock-shaft *u* a corresponding extent.

The rock-shafts *u u* are provided with cranks *y y*, which are pivotally connected with reciprocating links *z z*. The latter are pivotally connected to levers 1 1, pivoted on shaft 2 2, and the levers 1 1 are in turn pivotally connected with reciprocating arms 3 3. The arms 3 3 are arranged to swing vertically and are provided at their outer ends with hooks 4 4, which are adapted to engage with and be disengaged from pins 5 5 on toothed segments 6 6, gearing with pinions 8 8 on the sets of wheels composing the respective registers. By such arrangement when a key in one of the rows of value-keys is depressed and the segment *p*, coöperating with that row, is turned an amount dependent of the position of such key the shaft *u*, connected therewith, will be correspondingly turned and will operate through its link *z* and lever 1 to draw its arm 3 rearwardly to an extent to cause the toothed segment 6, associated therewith, to rotate the pinion 8 the amount necessary to register the number represented by the key depressed.

The left-hand segment *p*, Figs. 3 and 4, is connected with the uppermost shaft *u*, Fig. 8, and this shaft coöperates with the uppermost sets of register-wheels in the register, Fig. 8. The next segment to the right is connected with the next lower shaft *u*, and the latter coöperates with the next lower sets of register-wheels, and so on. By this arrangement the values designated by the value-keys can be registered upon any one of the registers—tens of dollars (designated by the left-hand row or bank of keys) upon the uppermost sets of wheels, units of dollars upon the next lower set of wheels, tens of cents upon the next to the lowest wheels, and units of cents upon the lowermost ones.

The pinions 8 8 drive their respective register-wheels through the medium of pawls 9 9 and ratchet-wheels 10 10, whereby the return of the toothed segments 6 6 to normal position does not turn the register-wheels back also.

The value-keys can be connected with any one of the registers *k*, *l*, *m*, *n*, and *o* by swinging the arms 3 3 of such register so as to cause their hooks 4 4 to engage the pins 5 5 on the toothed segments 6 6 actuating the sets of wheels composing that register.

In accordance with my invention the registration can be made either upon the general register or upon any one of the special registers and when made upon any one of the special registers will not be made upon the general register.

As a preferred arrangement the general register is normally connected with the value-keys, and the special registers are normally disconnected therefrom, and the special registers can be independently connected with such keys, and when any one of them is so connected the general register will be automatically disconnected. The mechanism shown for this purpose involves vertically-reciprocating bars 14 14, one for each register, into each of which the four arms of that register are fitted, as shown in Fig. 3. All of these bars 14 14 are subject to springs 15 15, acting upon their lower ends, by which they are normally held in an elevated position. In this way the arms 3 3 of the special registers having their hooks above the pins 5 5 are normally disengaged therefrom, while those of the general register having their hooks below the pins 5 5, as shown in dotted lines in Fig. 8, are normally engaged therewith. A rock-shaft 16 is arranged below and forward of the reciprocating bars 14 14 and is provided with rocker-arms 17 17, which extend rearwardly alongside of the lower ends of the bars 14 14. The rocker-arm 17, alongside of the bar 14 of the general register, is pivotally connected with said bar. The arms of the special registers extend below pins 18 18 on the bars 14 14 for those registers. By such arrangement the depression of any one of the bars 14 14 of the special registers will lower the arms 3 3 of that register, and thereby connect it for registration, and will at the same time lower the bar 14, and thereby disconnect the general register from the value-keys. While the registers could be thus connected and disconnected by any suitable mechanism, they are desirably connected and disconnected by the respective clerk's or department keys $f$, $g$, $h$, and $i$. To such end the bars 14 14 are provided with pins 20 20, against which inclinations 22 on the clerk's or department keys will strike, so as to lower the respective bars when such keys are inserted, Fig. 8. By such arrangement it is apparent that the registration of any transaction will normally be made upon the general register $k$; but if any one of the clerk's keys $f$, $g$, $h$, or $i$ be inserted the general register $k$ will be automatically disconnected and either register $l$, $m$, $n$, or $o$, as the case may be, connected, so that the registration will be made upon one of them.

Upon the withdrawal of the clerk's key inserted the special register corresponding thereto will be automatically disconnected and the general register again automatically connected.

The amount registered is also automatically indicated through four openings 25 25 in the upper part of the machine. These four openings are respectively for tens of dollars, units of dollars, tens of cents, and units of cents, considered from left to right. To such end four endless belts or bands 26 26, having numerals from "0" to "9," inclusive, are arranged within the machine and mounted upon loose pulleys 27 27 and 28 28, so that they can be moved in a way to bring any of their numerals opposite the respective openings 25 25. As a simple arrangement for properly moving the belts 26 26 the lower pulleys 28 28 are turned by vertically-reciprocating racks 29 29, whose lower ends are pivotally connected with arms 30 30 on the horizontal shafts $u$ $u$. The left-hand pulley 28 coöperates with the uppermost shaft $u$, the next pulley to the right coöperates with the next lower shaft $u$, and so on. By such arrangement when one of the value-keys of the first row or bank thereof is depressed and the coöperating segments and shaft $u$ thereby turned the arm 30 on said shaft will elevate the rack 29, and thereby turn the lower pulley 28 to an extent to move the numeral corresponding to the numeral on the key depressed into position behind the corresponding opening 25.

It is obvious that the proper indication for the amount of each sale or transaction will occur irrespective of the register upon which the same is registered.

I also desirably make arrangements for the indication of the nature of the transaction or of the reason for operating the machine when no sale is made—for indicating, for instance, the word "Change," "Balance," "Exchange," and so on. This indication is made through an aperture 32 in the upper right-hand side of the machine by a roller 33, bearing such words. This roller 33 is operated by a thumb-wheel 57 on a shaft 35, projecting from the machine and connected with the roller 33 by a sprocket-chain 36, Figs. 3 and 5.

I also desirably arrange for the automatic printing or recording of the various details of each transaction, such as its amount, its nature, the date when it was made, its number, and the name or mark of the clerk or department making it. To such end type-wheels 37 37 37 37, 38, 39, 40, 41, 42 42 42, and 43 are mounted upon the spindle 35, Figs. 3, 4, 10, 11, 12, and 13, and a reciprocating printing-plunger 64, Figs. 9 and 10, is arranged below them, so that when elevated it will cause the types on the type-wheels lowermost at the time to print. The type-wheels 37 37 37 37 bear numerals from "0" to "9," inclusive. The two right-hand ones are for units and tens of cents and the two left-hand ones for units and tens of dollars. The wheel 38 has abbreviations indicating different kinds of transactions, such as "Change," "Charged," "Balance," and the like. The wheel 39 has numerals from "0" to "9," inclusive, and the wheel 40 the numerals "1," "2," and "3," the two together being to indicate the day of the month on which the transaction is made. The wheel 41 bears abbreviations of the names of the different months of the year, such as "Jan.," "Feb.," "Mar.," &c. The wheels 42 42 42 bear numerals from "0" to "9," inclusive, and are to be used together to indicate the respective numbers of the successive transactions registered by the machine. The wheel 43 bears the letters "A," "B," "C," and "D" to indicate the clerk or department registering each transaction.

When any of the keys in one or more of the four rows or banks of value-keys are depressed, the proper one or ones of the type-wheels 37 37 37 37 are turned so as to bring into printing position the numerals corresponding to those on the keys depressed. The mechanism for this purpose is best shown in Figs. 4, 5, and 6. It involves rocker-arms 44 44 on the shafts $u$ $u$, racks 45 45, pivotally connected with the ends of the arms 44 44, and pinions 46 46, meshing with the racks 45 45. The two outermost or end pinions 46 46 are mounted upon spindles 47 47, and the two intermediate or inner pinions 46 46 are on sleeves 48 48, which inclose the spindles 47 47, Figs.

4 and 11. Both the spindles 47 47 and sleeves 48 48 carry pinions 49 49, which mesh with the pinions 50 50 on the type-wheels 37 37 37 37. The wheel 38 is keyed to the shaft 35, Fig. 10, so that when said shaft is turned to bring the desired word—such as "Change," "Balance," or the like—upon the roller 33 into position for exposure through the opening 32 it will also turn the corresponding abbreviation on the wheel 38 into printing position. The shaft 35 is provided with a thumb-wheel 57 for that purpose. The wheel 39 is turned by turning a thumb-wheel 53 on a spindle 54, carrying a pinion 55, which meshes with a gear 56 on the wheel 39. The wheel 40 is turned by a thumb-wheel 58 on a sleeve 59, which incloses the spindle 54, and has an arm 60 at its inner end, connected by a link 61 with the wheel 40. The wheel 41 is turned but once a month, and this can be done by hand by opening the case of the machine.

The clerk's type-wheel 43 is normally in position to print the letter "A" for clerk or department A. The wheel is turned so as to bring any of the other letters "B," "C," or "D" into printing position upon the insertion of the corresponding one of the clerk's keys $g$, $h$, or $i$. The mechanism for this purpose consists of a rock-shaft 65, Figs. 4, 7, and 8, having three rocker-arms 66 66 66, which are arranged in proximity to the openings in the case for the keys $g$, $h$, and $i$ and have their ends bent laterally so as to be struck by the inclines 22 22 on said keys. The arms 66 66 are inclined at different angles, as well shown in Figs. 7 and 8, so that the shaft 65 will be turned different amounts when the respective arms are struck by the different keys. The rock-shaft 65 is also provided with a long arm 67, Figs. 4 and 7, and the latter is pivotally connected with a link 68, Figs. 3 and 7, which is in turn pivotally connected with the clerk's type-wheel 43.

The wheels 42 42 42 are turned, so as to designate the successive operation of the machine, by a connection with the printing-platen 64, the connection shown consisting of a rod 70, Figs. 9, 12, and 13, secured to the platen and pivotally connected with a weighted pivoted lever 71, having a pawl 72, which engages the teeth of a pinion 73 on the left-hand wheel 42. When the platen is elevated to print, the pawl 72 slips over the teeth of the pinion without turning the wheel 73; but when the platen descends the pivoted lever 71 drops, and thereby turns said pinion one space. The wheels 42 42 42 are connected like cyclometer-wheels, so that when the first one turns completely around it turns the second one one space and when the second turns completely around it turns the right-hand one one space.

The printing-platen is operated with hand-lever 75 at the left-hand end of the machine, as shown in Figs. 1 and 3. The lever 75 is mounted upon the end of a shaft 76, which extends through nearly to the right-hand side of the machine, Figs. 3 and 4, and is subject to a spring 90, which tends to turn it to normal position, Fig. 1. The shaft 76 carries the crank 77, to which is pivotally connected a catch 78, having a hook at its upper end. This catch 78 engages a short arm 79, which is secured to a shaft 80, which also carries a couple of long arms 81 81, Figs. 4 and 9. The latter are connected with the printing-platen 64 by means of a couple of links 82 82, Figs. 9 and 10. The catch 78 is provided with a lug 85, which strikes against a screw or pin 86 when the crank 77 is sufficiently depressed. A coil-spring 87 on the shaft 80 tends to turn the latter in a direction to swing the arms 81 81 upwardly.

To operate the printing mechanism, the lever 75 is swung downwardly, thereby swinging the crank 77 and lowering the arm 79, arms 81 81, links 82 82, and the platen 64. When the crank 77 is swung downward to an extent to cause the lug 85 to strike against the pin 86, the catch 78 is swung rearwardly, whereupon the arm 79 is tripped or released and the spring 87 permitted to swing the arms 81 81 upward, and thereby cause the platen to print. When the hand-lever 75 is released and restored to its normal position by the spring 90, the crank 77 and catch 78 rise, so that the latter again engages with the arm 79 ready for the next operation.

The record is printed from the various type-wheels upon a couple of strips of paper 91 and 92 through the medium of a copying-ribbon 93, which is doubled over a roll 94, Fig. 10, and coiled upon reels 95 95 inclosed in a case 96.

The paper strip 91 is carried by a reel 98 and is fed out of the opening 99 in the case of the machine and is to be torn off and given to the purchaser with the record printed upon it, Fig. 9. The paper strip 92 is carried by a reel 100 and is coiled upon a reel 101, where it is retained in the machine for the proprietor. The strip 92 is also desirably drawn out of the opening 99 and then again into the machine through another opening 102, so that any matter written upon the upper strip 91 can also be transcribed upon the strip 92, and thereby give the proprietor a complete record of everything written or printed upon the check given to the purchaser. A shelf or table 103 is arranged below and between the openings 99 and 102, and a copying-ribbon 104 is extended over this shelf 103, so as to transcribe the writing upon the upper strip to the lower strip.

The record-strips 91 and 92 are automatically advanced after printing the record of each transaction upon them by a couple of feed-wheels 106 and 107, the former of which runs idly and the latter of which is positively driven, so as to turn the former. The positively-driven wheel 107 is turned by suitable connections with the printing mechanism. The connections shown comprise a link 108, pivotally connected with the crank-arm 77 on the shaft 76, and a toothed segment 109, having a laterally-extending arm 110, which is pivotally connected with the link 108. The segment 109 meshes with a pinion 111, which is loose on the spindle of the feed-wheel 107 and is arranged to drive said feed-wheel in a forward direction by a pawl 112 on the feed-wheel and a ratchet 113, fixed to the pinion 111. By such arrangement when the hand-lever 75 is turned and the shaft 76 rocked the link 108 is drawn downwardly, thereby causing the segment 109 to turn the pinion 111 loosely on its spindle. When the hand-lever 75 is released and the shaft 76 restored to its original position, the segment 109 will swing backwardly and cause the pinion 111 to turn the feed-wheel 107, through the medium of the pawl-and-ratchet mechanism. The storage-reel 101 is also automatically turned after the printing of the record upon the strips. The mechanism shown for this purpose comprises a link 115, pivotally connected to an arm 116, extended from the segment 109 and also pivotally connected with a segment 117, which gears with a pinion 118 on the reel. The pinion 118 is loose upon the reel-spindle and is arranged to drive the reel forwardly by a pawl 119 and ratchet 120. A spring 121 is attached to the arm 122 on the end of the segment 117 and tends to swing said segment upwardly. When the hand-lever 75 is depressed and the shaft 76 rocked, the link 115 is drawn to the left, thereby swinging the segment 117 downwardly and turning the pinion 118 loosely on the reel-spindle. When the hand-lever is released, the segment 117 is swung upwardly by the spring 121 and the wheel turned through the medium of the pawl-and-ratchet mechanism.

In order to permit the rotation of the reel 101 to gradually decrease in amount as the quantity of the paper upon it increases, the link 115 is provided with a slot 124, in which the pin connecting the link with the segment 117 can work. By such arrangement the link 115 will always draw the segment 117 downwardly; but the segment will be returned by the spring 121 only such an extent as is necessary to coil the proper amount of the record-strip upon it.

The clerks' drawers a, b, c, and d are partially unlocked upon the insertion of the corresponding one of the clerks' keys f, g, h, and i and are completely unlocked upon the printing of the record by the operation of the hand-lever 75. This is conveniently done by having two locks upon each drawer and having one of them unlocked by the respective clerk's key and the other unlocked by the hand-lever.

The locks unlocked by the respective clerk's or department keys consist of vertically-reciprocating pins or rods 130 130, Figs. 5 and 7, adapted to engage the catches 131 131 on the rear ends of the drawers. These rods 130 130 are operated by bell-cranks 132 132 and links 133 133, pivotally connected to pivoted levers 134 134, loose on the shaft 135. When any one of the clerks' keys is inserted, its inner end strikes against the upper end of the corresponding pivoted lever 134, which thereupon draws its link 133 forwardly, and thereby causes the connected bell-crank 132 to raise its locking-bar 130 and disengage the same from its catch 131.

The locks operated by the hand-lever 75 consist of pins 137 137, Figs. 3, 5, and 7, carried by the vertically-reciprocating locking-bar 138 and adapted to engage catches 139 139 on the respective drawers. The upper end of the locking-bar 138 is pivotally connected to a pivoted lever 140, whose forward end is depressed by the lug 141 on a collar 142 on the shaft 76. When the hand-lever 75 is turned, the pivoted lever 140 is swung, so as to elevate the locking-bar 138, and thereby cause the latter to release the drawer which had been previously partially unlocked by the introduction of the corresponding clerk's key. Obviously since the other drawers have not been released from their department or clerk's key locks none of them will open.

When any drawer is fully unlocked, it is opened by the corresponding one of a series of drawer-opening mechanisms, which are best shown in Figs. 3, 5, and 6. Each of these comprises a reel 145 and a cord 146, having one of its ends coiled about the reel and its other end attached to the rear of the bottom of the drawer and having its intermediate portion drawn about an idler-pulley 147. The reels 145 145 are subject to springs 148 148, tending to coil the cords 146 146 upon the reels. When any drawer is unlocked, its cord 146 will be automatically coiled upon the corresponding reel 145, and the drawer thereby opened to its full extent.

Whenever the machine is operated, the registering and indicating mechanisms and the type-wheels are automatically held in operated condition until another operation of the machine is begun by the introduction of one of the clerk's keys, when they are restored to their normal positions. To such end the machine is provided with locking mechanism operated by any one of the clerks' keys f, g, h, and i. The mechanism shown comprises pawls 150 150, adapted to engage the teeth of the pinions on the type-wheels 37 37 and mounted upon a rock-shaft 151. The rock-shaft 151 has a crank-arm 152, Figs. 4, 7, and 11, which is pivotally connected with a link 153, Fig. 7, which latter is in turn pivotally connected with a rocker-arm 154, fixed on the shaft 135, supporting the pivoted levers 134. The shaft 137 is provided with a series of arms 155, carrying laterally-projecting pins, which project to the rear of the respective levers 134, whereby when any one of said levers is operated by its respective clerk's key the shaft 135 will be rocked without, however, rocking any of the other levers 134. By such arrangement the spring-controlled pawls 150 will automatically hold the corresponding type-wheels 37 37 in any position to which they may be turned, and they in turn will hold the registering and indicating mechanisms in their operated positions; but when any clerk's key is inserted and the corresponding pivoted lever 134 is actuated the shaft 135 will be rocked and will thereupon cause its arm 154 to elevate the link 153 and turn the shaft 151, so as to raise the pawls 150 and disengage them from the teeth of the wheels 37 37, whereupon the type-wheels and the registering and indicating mechanisms will automatically restore themselves to normal or zero positions by the segments $p$ falling forwardly and downwardly of their own weight.

The operation of the machine is as follows: The clerk or department desiring to register and record a transaction inserts the proper key $f$, $g$, $h$, or $i$ into the machine. In so doing the registering and indicating mechanisms and the type-wheels are automatically returned to their zero positions, the corresponding type-wheel is set in printing position, and the corresponding cash or special register is connected with the registering mechanism and the general or credit register disconnected therefrom. If the transaction is to be a cash transaction, the clerk's key is allowed to remain in the machine, thereby allowing the cash-register to remain connected for registration; but if the transaction is a credit one the key is withdrawn, thereby allowing this cash-register to be disconnected and the credit-register to be connected for registration. In such a case, however, the indicator and type-wheel representing the clerk who inserted and then withdrew the detachable key will be set and the cash-drawer released. The withdrawing of the key simply again renders that particular clerk's counter inoperative and the "credit" counter operative. The proper value-keys to designate the amount of the transaction are then depressed. In so doing the corresponding amount is registered upon the register which is connected with such keys and is indicated by the indicators, and the type-wheels are set so as to put figures designating the corresponding amount in printing position. The hand-lever 75 is then drawn forward and the two record-strips thereby printed and one of them fed out of the machine and the other coiled within it, and the drawer of the clerk or department operating the machine is completely unlocked, so that it can automatically open. When the clerk's key is first inserted, the lock 130 of the drawer pertaining to that particular key is elevated. The drawer is then released and springs forward slightly until its latch 139 contacts with its particular pin 137 on the latch-bar 138. When this bar is subsequently raised upon the actuation of the operating-lever, the drawer is entirely released and is forced from the casing by the devices heretofore described. The latch 30 when released falls by gravity into latched position; but, if so desired, any suitable spring may be employed for drawing it downward.

I also desirably provide computing mechanism by which the values of different amounts or quantities of various commodities can be computed.

The computing mechanism shown comprises a roller 160, Figs. 5 and 6, bearing upon it a table consisting of a number of columns each headed by a numeral which is to designate the price of each unit of quantity of the commodity and each containing a series of numerals below the head numeral which are the numerals necessary to produce the successive units when multiplied by the head numeral. This roller is arranged within the upper right-hand portion of the machine-casing in such a position that the head numeral of any column can be made to appear through an aperture 161 in the casing and the other figures of that column appear through a slot 162 in the casing. The upper edge of the slot 162 is graduated and the graduations provided with the successive numerals, which are the products of the head figure of each column, into the various other figures of that column. In using the computing mechanism the roller 160 is turned until the numeral indicating the price of the unit of any commodity appears through the aperture 161. To find the cost of a given number of units of the commodity at that price, the figure in that column on the roller designating that number of units is found and the figure on the edge of the slot 162 opposite is read. This figure is the cost of the desired number of units.

To find the number of units of the commodity which can be purchased for a given price, the number on the edge of the slot 162 designating that price is found. The number in the column on the roller opposite that figure on the edge of the slot is the desired number of units.

What I claim as my invention is—

1. In a cash-register, the combination with a plurality of cash-receptacles each provided with a latching device, of a corresponding number of special registers, a general register, a single register-operating mechanism, means normally connecting the general register with the register-operating mechanism, special setting devices, and means by which the operation of a special setting device will release the latch of a certain receptacle, connect the corresponding special register with the register-operating mechanism and disconnect the general register therefrom.

2. The combination with a plurality of drawers, each provided with a locking device, a corresponding number of special registers, a general register, a single register-operating mechanism, means normally connecting the general register with the register-operating mechanism, special keys, and means by which the operation of any one of the special keys will unlock the lock on the corresponding drawer, and will connect the corresponding register with the register-operating mechanism and will disconnect the general register therefrom.

3. In a cash-register, the combination with a plurality of cash-receptacles each provided with a locking device, of a general register and a number of special registers corresponding to the number of cash-receptacles, a single register-operating mechanism, printing-types for indicating the users of the respective receptacles, means normally connecting the general register with the register-operating mechanism, special keys, and mechanism whereby the operation of any one of the special keys will unlock the corresponding receptacle, will set the corresponding type, will connect the corresponding special register with said register-operating mechanism and will disconnect the general register therefrom.

4. The combination with a plurality of drawers, each provided with a locking device, of a general register and a number of special registers corresponding to the number of drawers, a single register-operating mechanism, types for indicating the users of the drawers, means normally connecting the general register with said register-operating mechanism, special keys and mechanism whereby the operation of any one of the special keys will unlock the lock on the corresponding drawer, will set the corresponding type in printing position, will connect the corresponding special register with said register-operating mechanism and will disconnect the general register therefrom.

5. The combination with a plurality of drawers, of a corresponding number of registers and special keys, locking devices for said drawers, a single register-operating mechanism, and mechanism whereby the operation of any one of the special keys will simultaneously connect the corresponding register with said register-operating mechanism and unlock the locking device on the corresponding drawer.

6. The combination of a plurality of drawers, a general register, and a number of special registers corresponding to the number of drawers, a single register-operating mechanism, means normally connecting the general register with said register-operating mechanism, and means for disconnecting said register from said mechanism and connecting any one of the special registers therewith, and also for opening the drawer corresponding to the connected special register.

7. A cash-register comprising mechanism for registering values, a plurality of drawers, each provided with a locking device, a plurality of corresponding registers, special keys and mechanism whereby the operation of any one of the special keys will unlock the locking device of the corresponding drawer and connect the corresponding register with the valve mechanism.

8. In a cash-register, the combination with a common operating mechanism, of a series of special registers any one of which may be brought into connection with said operating mechanism, a series of cash-drawers, locks for said drawers, a series of special keys, and mechanism intermediate the keys and drawer-locks and the keys and registers for unlocking a particular drawer and throwing its respective register into connection with the operating mechanism by the operation of such key.

9. In a cash-register, the combination with a plurality of cash-receptacles, a plurality of corresponding registers, means for locking the receptacles and mechanism for partially and completely unlocking the receptacles in different operations.

10. In a cash-register, the combination with an operating mechanism, of a plurality of special counters any one of which may be brought into connection with said operating mechanism, a plurality of independent cash-receptacles, means for partially unlocking any desired receptacle and bringing its corresponding counter into operative relation with the operating mechanism, and independent devices for completely unlocking a selected receptacle.

11. In a cash-register, the combination with an operating mechanism, of a series of special counters any one of which may be brought into connection with the operating mechanism, a series of independent cash-receptacles, a printing mechanism, selective means for throwing a desired one of the counters into connection with the operating mechanism and partially unlocking the corresponding cash-receptacle, and independent means for fully unlocking the selected receptacle and operating the printing mechanism.

12. The combination with an operating mechanism, of a plurality of independent registers, a plurality of corresponding drawers, a plurality of identifying devices for the users of the several drawers, a single register-operating mechanism for operating any one of the registers, and a series of keys which when operated unlock the selected drawer, throw the proper register into connection with the operating mechanism and set the corresponding identifying device.

13. The combination with a plurality of cash-receptacles, of a plurality of corresponding registers, a single set or bank of value-keys for use in connection with each one of the registers, means for selecting the desired register and cash-receptacle, and mechanism intermediate the keys and the registers, for operating the latter, upon being moved by the depression of the keys.

14. The combination with a plurality of cash-receptacles, a plurality of corresponding registers, a single register-operating mechanism, a series of keys which when depressed actuate said register-operating mechanism, means for causing the operation of said mechanism to operate any desired one of the registers, means for opening the receptacle corresponding to the register receiving the registration, and means for printing the amount of the registration.

15. The combination with a plurality of drawers, of a plurality of corresponding registers, a single bank or set of operating value-keys for use in connection with all the registers, means receiving motion from the value-keys and arranged to transmit such motion to the selected register, means for opening the drawer corresponding to the register receiving the registration, and devices for printing the amount of the registration and the identity of the user of the drawer.

16. The combination with one or more rows or banks of value-keys, of a corresponding number of oscillatory segments, links having different lengths pivotally connected with the value-keys and the segments, a number of shafts gear-connected with said segments, a plurality of registers, and connections for connecting any one of said registers with said shafts.

17. The combination of one or more banks or rows of value-keys, a corresponding number of oscillatory segments, links connecting each segment with its keys, a corresponding number of shafts gear-connected with the segments, a plurality of registers, each consisting of a number of sets of wheels corresponding to the number of rows or banks of value-keys, and connections whereby all of said shafts can be connected with the sets of wheels composing any one of the registers.

18. The combination with the register-wheels, of toothed segments gearing with pinions thereon, and swinging arms having hooks adapted to engage said segments, and to be disengaged therefrom, whereby, when the same are drawn longitudinally, the pinions will be turned if the hooks are in engagement with the segments, but will not be turned if the same are disengaged therefrom.

19. The combination with a plurality of rows or banks of value-keys, of a corresponding number of swinging segments, links having successively greater lengths connecting the keys in each row or bank with the segment therefor, said links being arranged at an inclination to the key-shanks, so that the depression of the various keys in each row will swing the segment therefor successively greater amounts, a number of shafts corresponding to the number of rows or banks of keys, said shafts being gear-connected with the swinging segments, crank-arms on said rotary shafts, a general register and a plurality of special registers, each consisting of a number of sets of wheels corresponding to the number of rows or banks of value-keys, toothed segments gearing with pinions on each set of wheels, said segments being provided with pins, sets of swinging arms, one for each register, said arms having hooks adapted to engage the pins on the toothed segments, the arms of the general register being arranged below the pins, and the arms for the special registers being arranged above the pins, whereby the general register will be connected and the special registers disconnected when the respective arms thereof are elevated, and also whereby the general register will be connected and the special register connected when the respective arms thereof are lowered, pivoted levers and links connecting the swinging arms with the crank-arms on said rotary shafts, vertically-reciprocating bars, one for each register engaging all of the swinging arms of said register, springs tending to hold said reciprocating bars normally in elevated position, a horizontally-arranged shaft having arms, one of which is pivotally connected to the reciprocating bar of the general register, and the others of which are below pins on the said bars of the special registers, and special keys, each of which is adapted to engage a pin on the bar of the corresponding special register, and to lower said bar and thereby cause the simultaneous depression of the bar of the general register.

20. The combination with the value-keys, the links pivotally connected therewith, and the oscillatory segments pivotally connected to the links, of shafts gear-connected with the segments, and provided with lateral arms, racks pivotally connected to the ends of the arms, pulleys having pinions meshing with said racks, and indicator-bands mounted upon said pulleys.

21. The combination with a plurality of drawers respectively provided with locking devices, a corresponding number of special registers, a type-wheel having types for designating the users of the special drawers, special keys and mechanism whereby the operation of any one of the special keys will simultaneously unlock the locking device on the corresponding drawer, connect the corresponding register for registration, and turn the type-wheel so as to bring the corresponding type into printing position.

22. The combination with the general register and a plurality of special registers, of a number of drawers corresponding to the number of special registers, a single register-operating mechanism for operating any one of the registers, means normally connecting the general register with the register-operating mechanism, means for connecting any one of the special registers with said register-operating mechanism and disconnecting the general register therefrom, and also for unlocking the drawer corresponding to the connected register.

23. The combination with a plurality of drawers, of locking-bars, one for each drawer, bell-cranks to which said bars are pivotally connected, links pivotally connected to the other arms of said bell-cranks, pivoted levers connected with said links, and special keys adapted to swing said pivoted levers.

24. The combination with the type-wheel bearing the types to designate the users of the machine, of a link pivotally connected therewith, a rock-shaft having an arm pivotally connected with said link, and also having arms extending laterally at different inclinations, and keys having inclines adapted to strike said differently-inclined arms, and thereby rock said shaft different amounts.

25. The combination with a plurality of rows of value-keys, of a corresponding number of rotatable segments, links connecting the value-keys in each row with the corresponding segments, rotary shafts gear-connected with the segments and provided with swinging arms, racks pivotally connected to the ends of said arms, and a plurality of type-wheels, one for each row of value-keys, gear-connected with pinions which mesh with said racks.

26. The combination with the type-wheels, of a rock-shaft having spring-controlled arms adapted to engage teeth on said type-wheels, a link pivotally connected with a rocker-arm on said shaft, a second rock-shaft having a long arm pivotally connected with said link, and having a plurality of short arms, and special keys having inclined surfaces adapted to strike said short arms and thereby rock the last-mentioned rock-shaft.

27. The combination with a plurality of drawers, of a plurality of corresponding special registers, a general register, a single register-operating mechanism, means normally connecting the general register with the register-operating mechanism, means for connecting any one of the special registers with such mechanism and for disconnecting the general register therefrom, means for opening the drawer corresponding to the connected register, and means for printing the amount of the registration.

28. The combination with a printing-platen, of a rock-shaft having arms link-connected with the platen, a spring tending to turn said shaft so as to swing the arms thereon upward, a hand-operated shaft having a crank-arm, and a catch pivotally connected to the end of the crank-arm and constructed to engage a dog on said rock-shaft, and also constructed with a lug adapted to strike when the hand-operated shaft is turned so as to swing the catch and thereby trip or release the dog.

29. The combination with the printing-platen, of a rock-shaft having arms link-connected with the platen, means tending to turn said rock-shaft so as to swing the arms upward, a second rock-shaft provided with a catch adapted to engage the first-mentioned shaft and swing it downwardly when turned, and means for tripping said catch so as to release the first-mentioned shaft when the second-mentioned one is sufficiently turned.

30. The combination of a rock-shaft, a feed-roller having a pinion loose upon the spindle thereof and provided with pawl-and-ratchet mechanism, a toothed segment gearing with said pinion and link-connected with a crank-arm on said rock-shaft, spring means tending to swing the segments in a direction to cause the pinion to drive the roller whereby the turning of the rock-shaft to operate the platen will cause the segment to turn the pinion loosely, and the return of the rock-shaft to normal position will cause the pinion to turn the feed-roller through the pawl-and-ratchet mechanism.

31. The combination with a storage-reel having a pinion loose on its spindle, pawl-and-ratchet mechanism for driving the reel when the pinion is turned in one direction, a toothed segment gearing with said pinion, a spring tending to swing said segment in a direction to cause the pinion to turn the reel, a link having a slot in which the pin on said segment can work, and mechanism for reciprocating the link.

32. The combination of a feed-roller and a storage-reel, each having a pinion mounted loosely upon its spindle, and provided with pawl-and-ratchet mechanism for turning it in one direction only, toothed segments meshing with said pinions, spring means tending to swing both of said segments in a direction to cause the pinions to turn the roller and reel respectively, a link pivotally connected with an extension on the segment meshing with the feed-roller segment, and having a slot on which the pinion on the reel-segment works, a link pivotally connected with an arm extended laterally on the roller-segment, and a rock-shaft having a crank-arm pivotally connected with the other end of said link.

33. The combination with a reciprocating locking-bar, of the pivoted lever pivotally connected therewith, and a rock-shaft having a collar which is constructed with a dog adapted to engage one end of said pivoted lever and swing the same when the rock-shaft is turned.

34. A cash-register comprising a plurality of drawers, a plurality of corresponding registers, means for locking the drawers, and mechanism for partially and completely unlocking the drawers in different operations.

35. A cash-register comprising mechanism for registering values, a plurality of drawers, a corresponding number of independent registers, means for printing the amount of the registration, means for connecting any one of the registers with the registering mechanism, and for partially unlocking the corresponding drawer, and means for simultaneously operating the printing mechanism and completely unlocking said drawer.

36. A cash-register comprising mechanism for registering values, a plurality of independent cash-drawers, corresponding keys and special registers, mechanism whereby the operation of any one of the special keys connects the corresponding register with the registering mechanism, types to indicate the amount of registration, and also the operator of the machine, mechanism whereby the operation of the registering mechanism sets the proper types in position irrespective of the register connected with such mechanism, mechanism whereby the operation of one of the special keys sets the corresponding type in printing position, means for partially unlocking the drawer upon the operation of any one of the special keys, printing mechanism, and means for simultaneously operating the printing mechanism and completely unlocking said drawer.

37. A cash-register comprising mechanism for registering values, a plurality of independent drawers, corresponding special keys and special registers, a general register, means for normally connecting the general register with the registering mechanism, type-wheels to designate the amount of the registration and also the user of the machine, means whereby the operation of any of the special keys will disconnect the general register from the registering mechanism, and connect the corresponding special register therewith, and will also partially unlock the corresponding drawer and set the proper type in printing position, means whereby the operation of the registering mechanism will set the proper type-wheel in printing position irrespective of the register connected for registration, printing mechanism, and means for simultaneously operating the printing mechanism and completely unlocking the drawer previously partially unlocked.

38. The combination with the register-wheels provided with pinions, of toothed segments gearing with said pinions and provided with pins, swinging arms having hooks capable of engaging said pins, pivoted levers connected with said arms, links pivotally connected with said levers, and rock-shafts having crank-arms pivotally connected with said links.

39. The combination with the register-wheels having pinions, of toothed segments gearing with said pinions, swinging arms having hooks capable of engaging said pins, pivoted levers pivotally connected with said arms, links pivotally connected with said levers, rock-shafts having crank-arms pivotally connected with said links, value-keys and rotatable segments operated by said value-keys, and gear-connected with the shafts carrying said crank-arms.

40. The combination with the register-wheels provided with pinions, of toothed segments gearing with said pinions, swinging arms adapted to be engaged with and disengaged from said segments, means for drawing said arms so as to turn the segments and thereby turn the register-wheels, means for swinging all of said arms simultaneously into engagement with the toothed segments and special keys for operating said mechanism.

41. The combination with the register-wheels, of means for operating the same, means for throwing said operating mechanism into and out of engagement with the register-wheels, a special key for actuating the engaging means, said keys being separable and adapted to operate the engaging means when inserted.

42. The combination with the register-wheels, of the swinging arms for operating the same, a reciprocating bar engaging said arms and provided with a shoulder, a spring tending to hold said bar in normal position, and a key having an inclination adapted to engage the shoulder on said bar and move the bar when operated.

43. The combination with the register-wheel provided with pinions, of toothed segments meshing with said pinions and provided with pins, swinging arms having hooks adapted to engage said pins, means for operating said swinging arms so as to cause them to operate the register-wheels, a reciprocating bar engaging all of said arms and provided with a shoulder, and keys having an inclination adapted to strike against the shoulder on said bar and thereby cause the longitudinal movement of the bar.

44. The combination with the register-wheels provided with pinions, of toothed segments meshing with said pinions and provided with pins, swinging arms having hooks capable of engaging said pins, pivoted levers pivotally connected with the ends of said arms, links pivotally connected with said levers, rock-shafts having crank-arms pivotally connected with said links, the value-keys, and means for turning said rock-shafts by the operation of such keys, a reciprocating bar engaging said crank-arms, a spring tending to hold said bar in normal position, and a detachable key adapted to engage said bar when inserted and operate the same against the force of the spring.

45. The combination with a general and a special register each consisting of a number of sets of register-wheels, each of which is provided with a pinion, of toothed segments gearing with said pinions and provided with pins, swinging arms having hooks adapted to engage the pins on said segments, the hooks of the general-register arms being on one side of the pins, and the hooks of the special-register arms being on the other side of the special-register pins, means for operating said arms so as to cause the turning of the register-wheels when the arms are engaged with pins, a couple of reciprocating rods respectively engaging the arms of the general and special registers, springs tending to hold said arms in corresponding positions whereby the arms of one register will be engaged with the segments thereof, and the arms of the other will be disengaged from its segments, a rock-shaft having arms engaging bars, and a special key adapted, when operated, to actuate the bar engaging the arms of the special register, and thereby the connections of the two registers.

46. The combination with a set of register-wheels, each provided with pinions, of toothed segments gearing with said pinions, swinging arms, one for each segment, each adapted to be moved longitudinally and each provided with an engaging device capable of being engaged with and disengaged from the coöperating engaging device on its allotted segment, so that if the arms are drawn longitudinally they will operate the segments and thereby turn the register-wheels if the engaging devices on the arms and segments are in engagement with one another but will not turn such segments if such engaging devices are not in engagement, and mechanism for moving said arms longitudinally.

47. The combination with a general register and a number of special registers, of a number of sets of vertically-swinging arms, one set for each register, means whereby the arms for the special registers are connected with said registers when in their lowered positions, and are disconnected therefrom when in their elevated positions, means whereby the arms of the general register are connected therewith when in their elevated positions, and disconnected therefrom when in their lowered positions, reciprocating bars, each one connecting together the arms of one of the registers, a rock-shaft having arms extending below said reciprocating bars so that the depression of any one thereof will turn the rock-shaft, spring means holding all of said bars in an elevated position, and keys for the special registers adapted, when operated, to engage the corresponding reciprocating bar and depress the same and thereby connect the corresponding special register and disconnect the general register.

48. The combination with a general register and a number of special registers, of a number of sets of vertically-swinging arms, one set for each register, means whereby the arms of the special registers are connected with said registers when in lowered positions and are disconnected therefrom when in elevated positions, means whereby the arms of the general register are connected therewith when in elevated positions and disconnected therefrom when in lowered positions, a number of reciprocating bars, each one connecting together the arms of one of the registers, a rock-shaft having arms extending below said reciprocating bars so that the depression of any one thereof will turn the rock-shaft, spring means holding all of said bars in an elevated position, and keys for the special registers adapted, when operated, to engage the corresponding reciprocating bar and depress the same and thereby connect the corresponding special register and disconnect the general register.

49. The combination with the value mechanism, of a couple of registers, means normally connecting one of said registers with said mechanism, means whereby the other register can be connected with the same, and a detachable key and mechanism whereby said key can, upon insertion, disconnect the general register and connect the special register, and will, upon withdrawal, allow the restoration of the original conditions.

50. The combination with a plurality of rows or banks of value-keys, of a general register and a plurality of special registers, each consisting of a number of sets of wheels corresponding to the number of rows or banks of value-keys, means normally connecting the general register with the value-keys, a plurality of separable or detachable keys, and means whereby any such key will, upon insertion, connect its corresponding register and disconnect the general register.

51. In a cash-register, the combination of a plurality of separable keys, all having like inclined surfaces or shoulders, and all having longitudinal grooves which are dissimilarly situated in the different keys, and a device arranged over all of the keys and operated by the inclined surfaces or shoulders thereon.

52. In a cash-register, the combination with an operating mechanism, of a general register, a plurality of special registers, means normally connecting the general register with the operating mechanism, a series of detachable keys, means operated by a key, when the same is inserted, to bring its respective special register into connection with the operating mechanism and disconnecting the special register, and means for automatically restoring the general register to its operative condition upon the withdrawal of the inserted key.

53. In a cash-register, the combination with a common operating mechanism, of a general register normally connected thereto, a series of special registers, a series of detachable keys, means operated by the insertion of any one of the keys for bringing its respective register into connection with the operating mechanism and disconnecting the general register therefrom, means for automatically disengaging the special register from the operating mechanism when the key is withdrawn, and independent means for automatically reconnecting the general register with the operating mechanism.

54. In a cash-register, the combination with a series of cash-receptacles, of two locks for each receptacle, a special operating device for operating one of the locks of any desired receptacle, an operating-lever, and cams actuated by said lever for operating the remaining lock of the receptacle.

55. In a cash-register, the combination with a plurality of cash-receptacles, of two locks for each of said receptacles which are arranged to successively unlock the receptacles, selective means for operating one of the locks of the desired receptacle, and independent means for operating the remaining lock of the desired receptacle.

56. In a key-operated cash-register, the combination with a common operating mechanism, of keys for actuating the same graduated distances, a general register normally in connection with the operating mechanism, a series of special registers, and special keys for bringing any desired one of the special registers into connection with the operating mechanism and throwing the general register out of such connection.

57. In a cash-register, the combination with a series of special registers and a general register, of a series of oscillatory register-operating elements arranged to move automatically in one direction and be positively moved in the opposite direction, ratchet-and-pawl connections between the operating elements and the respective counters, and mechanism for rendering the ratchet-and-pawl connections of any desired one of the special counters operative in connection with the oscillatory operating elements and simultaneously breaking the connection between the ratchet-and-pawl devices of the general register and said register-operating elements.

58. In a cash-register, the combination with a series of special counters having ratchet-and-pawl operating devices, of a general counter having similar operating devices, an oscillatory register-operating member automatically moving in one direction, means for positively moving said member in the opposite direction, a series of special keys, and means arranged to be operated by the special keys for establishing the operative relation of the ratchet-and-pawl devices of one of the special counters with the oscillatory operating member and simultaneously breaking the operative connection of the ratchet devices of the general register with said operating member.

59. In a cash-register, the combination with a series of special registers having ratchet-and-pawl operating devices, of a general register having similar operating devices, oscillatory members having graduated movements, means for moving said members positively in one direction, springs for moving the members in the opposite direction, selecting devices, and means intermediate the selecting devices for establishing an operative relation between the register-operating member and the ratchet-and-pawl devices of one of the special registers and simultaneously breaking a similar connection with the general register.

60. The combination with a plurality of cash-receptacles, of a plurality of corresponding registers, a register-operating mechanism, printing devices connected to said mechanism, means for causing the operation of said mechanism to operate any desired one of the registers, means for opening the receptacle corresponding to the register receiving the registration, and means for printing a designation indicative of the register into which the transaction has been added.

61. The combination with a plurality of cash-receptacles, of a plurality of corresponding registers, a single register-operating mechanism, a printing mechanism, and a single selective mechanism which when operated controls the opening of a receptacle, the operation of a certain register, and the printing of a certain designation by the printing device.

62. The combination with a plurality of drawers, of a corresponding number of registers, locking devices for said drawers, a single register-operating mechanism for operating any one of said registers, and mechanism for connecting any register with said register-operating mechanism and for simultaneously unlocking the locking device on the drawer, corresponding to the connected register.

63. The combination of a plurality of drawers, a plurality of corresponding registers, a single register-operating mechanism for operating any one of the registers, and means for unlocking the drawer corresponding to the register receiving the registration.

64. The combination of a plurality of drawers, a plurality of corresponding registers, a plurality of identifying devices for the users of the devices, a single register-operating mechanism for operating any one of the registers, and means for connecting any one of the registers with said mechanism and also for unlocking the corresponding drawer and setting the corresponding indicating devices for record.

65. The combination of a plurality of drawers, a plurality of corresponding registers, a single set or bank of value-keys for use in connection with each one of the registers, means for registering the values of such keys upon any one of the registers as the result of the operation of such keys, and means for unlocking the drawer corresponding to the register receiving the registration.

66. The combination of a plurality of drawers, a plurality of corresponding registers, a single register-operating mechanism, means for causing the operation of said mechanism to operate any desired one of the registers, means for opening the drawer corresponding to the register receiving the registration, and means for printing the amount of the registration.

67. A cash-register comprising a plurality of drawers, a plurality of corresponding registers, a single register-operating mechanism, means for causing the operation of any one of the registers by the register-operating mechanism, and means for opening the drawer corresponding to the register receiving the registration.

68. The combination of a plurality of drawers, a plurality of corresponding registers, a single bank or set of value-keys for use in connection with all of the registers, means for registering upon any one of the registers the amounts designated by the value-keys upon the operation thereof, means for opening the drawer corresponding to the register receiving the registration, and means for printing the amount of the registration and the identity of the user of the drawer.

Signed by me at Chicago, Illinois, this 9th day of August, 1899.

EUGENE W. APPLEGATE.

Witnesses:
A. MILLER BELFIELD,
Q. E. MELDRUM.

---

Corrections in Letters Patent No. 750,791.

It is hereby certified that in Letters Patent No. 750,791, granted February 2, 1904, upon the application of Eugene W. Applegate, of Chicago, Illinois, for an improvement in "Cash-Registers," errors appear in the printed specification requiring correction, as follows: In line 72, page 7, the word "valve" should read *value*, and in line 106, page 12, the word "devices" should read *drawers;* and that the said Letters Patent should be read with these corrections therein that the same may conform to the record of the case in the Patent Office.

Signed and sealed this 16th day of February, A. D., 1904.

[SEAL.]

F. I. ALLEN,
*Commissioner of Patents.*